United States Patent [19]
Hauber et al.

[11] Patent Number: 6,164,702
[45] Date of Patent: Dec. 26, 2000

[54] REINFORCED THERMOPLASTIC PIPE COUPING

[75] Inventors: David Edgar Hauber, Troy; Robert John Langone; James Andrew Mondo, both of Clifton Park, all of N.Y.

[73] Assignee: ADC acquisition Company, Schenectady, N.Y.

[21] Appl. No.: 09/327,003

[22] Filed: Jun. 7, 1999

[51] Int. Cl.[7] ................................................ F16L 13/02

[52] U.S. Cl. .................... 285/21.2; 285/45; 285/131.1; 285/133.11; 285/179; 285/369; 285/381.5; 422/423; 422/906

[58] Field of Search .................................. 285/21.1, 21.2, 285/45, 131.1, 133.11, 179, 369, 381.5, 423, 906, 422

[56] References Cited

U.S. PATENT DOCUMENTS

| | | |
|---|---|---|
| 3,970,495 | 7/1976 | Ashton et al. . |
| 4,630,846 | 12/1986 | Nishino et al. ........................ 285/423 |
| 4,770,442 | 9/1988 | Sichler .................................. 285/21.2 |
| 4,875,710 | 10/1989 | Mercado . |
| 5,407,514 | 4/1995 | Butts et al. . |
| 5,830,248 | 11/1998 | Christianson et al. . |

FOREIGN PATENT DOCUMENTS

| | | | |
|---|---|---|---|
| 521276 | 1/1993 | European Pat. Off. ................ | 285/21 |

*Primary Examiner*—Dave W. Arola
*Attorney, Agent, or Firm*—John F. McDevitt

[57] ABSTRACT

A continuous fiber reinforced thermoplastic pipe coupling is disclosed having improved resistance to applied stress when used with pipe lengths being joined together. The fiber reinforcement is aligned during placement in a particular manner and placed at a predetermined fiber angles dictated mechanical forces being applied such as by internal fluid pressures in the coupled pipe lengths.

29 Claims, 5 Drawing Sheets

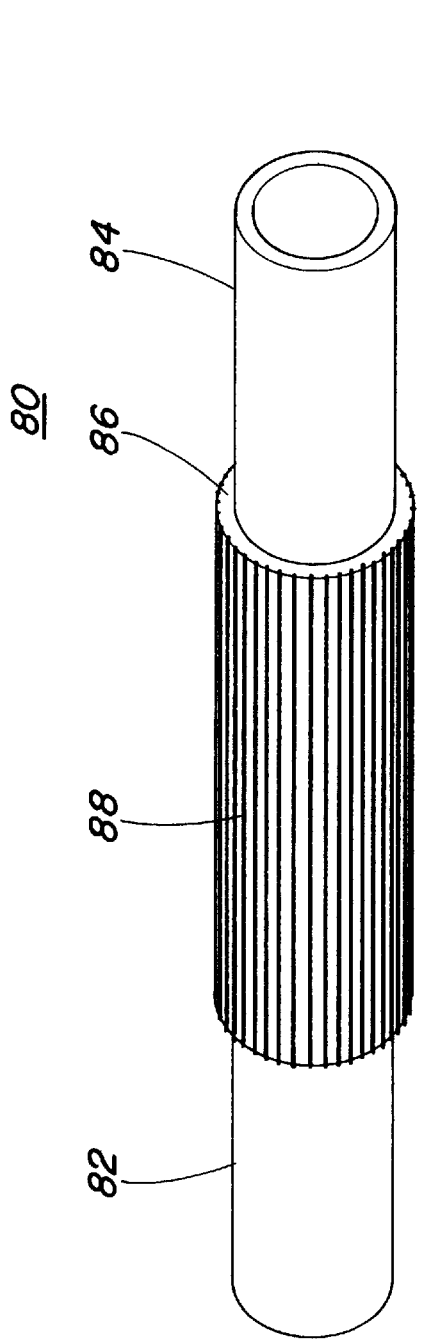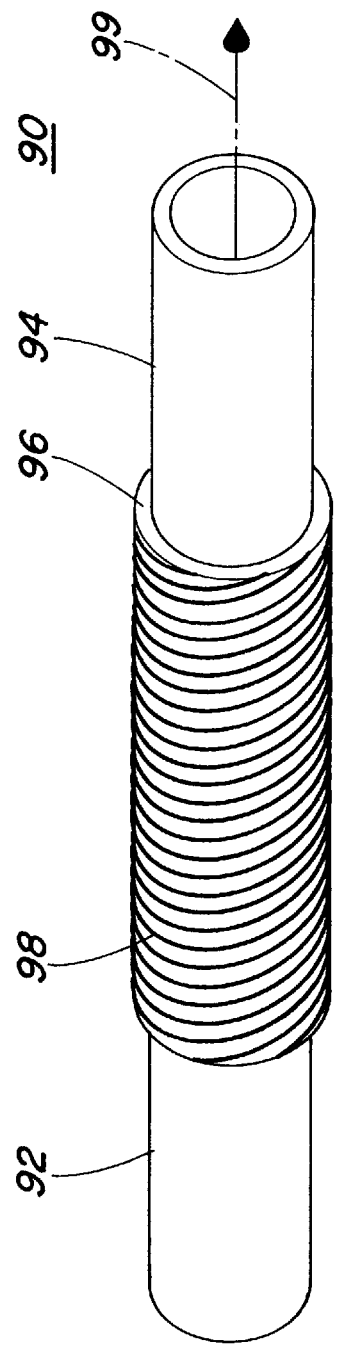
Fig. 4
Fig. 5

REINFORCED THERMOPLASTIC PIPE COUPING

BACKGROUND OF THE INVENTION

This invention relates generally to a reinforced coupler for attachment to pipe lengths being joined together and more particularly to a fiber reinforced thermoplastic pipe coupler having a novel construction imparting significantly improved mechanical strength at the joint location.

Thermoplastic pipe couplers which can include cylindrical sleeve members as well as other type fittings such as a tubular configuration enabling elbow, Y and T joints to be fashioned for pipe lengths being joined together are well known. Such couplers or couplings have long been used with pipe lengths while being formed with both thermoplastic and thermoset organic polymers, including copolymers, blends and the like, to enhance mechanical strength at the joint location. For example there is disclosed in U.S. Pat. No. 4,213,641 a filament wound glass fiber reinforced thermosetting resin pipe coupling being employed to join a pair of such pipe lengths together in an in-line configuration. Similarly, in U.S. Pat. No. 4,875,710 there is disclosed for in-line joinder of fiberglass reinforced pipe lengths with a liquid adhesive a fiber reinforced coupler having a cylindrical sleeve configuration and which includes multiple layers of fiberglass fibers bonded together with a cured thermoset resin. A coupler formed with thermoplastic polymer is disclosed in U.S. Pat. No. 5,775,736 which employs polyethylene or polyethylene copolymers and with the reinforcement being provided by means of a multi-part construction comprising an inner pipe or tubular member thermally bonded to an outer pipe or tubular member. Joinder of fiber reinforced thermoplastic pipe lengths together which includes an electrofusion type coupler is also disclosed in U.S. Pat. No. 5,824,179. In the described embodiment of said latter prior art patent for joining cylindrical pipe lengths together in an in-line configuration with butt welding, the electrofusion coupler is disclosed to be an outer cylindrical thermoplastic sleeve encircling the pipe members and thermally bonded thereto with electrical heating metal wires being embedded in the wall of the polymer matrix. A more complex electrofusion coupler is disclosed in U.S. Pat. No. 4,770,442 employing a cylindrical thermoplastic sleeve member which includes the metal heating wire being disposed adjacent the inside surface while being reinforced on the outside surface with a winding or covering formed with a material composition exhibiting a lower thermal expansion than that of the thermoplastic sleeve material. Such reinforcement is said to limit any outward radial expansion of the thermoplastic sleeve member during subsequent thermal bonding to the pipe lengths being joined.

The above illustrated prior art couplers are found overly difficult to construct as well as difficult to employ. Many of the known couplers require bonding to the pipe lengths being joined together with an adhesive thereby necessitating avoidance of contamination at the joint site, immobility of the joint while the adhesive is being cured and overly tight control of pipe and coupler physical dimensions. The construction of still other known couplers employing fiber reinforcement to improve mechanical strength at the joint location is likewise said to require an adhesive for the purpose of bonding the fibers to a body member being formed with thermoplastic or thermoset type organic polymer. Proper curing of these adhesives again entails additional processing steps being required for assembly of the coupler itself while frequently further requiring additional specialized equipment in order to do so. Such use of adhesives whether in construction or use of known couplers can also increase the difficulties of repairing the pipe joints in the field after leakage or rupture. Again, there can be requirements for specialized processing and equipment in order to make these repairs.

It remains desirable to provide an improved coupler which avoids these drawbacks while further exhibiting an improved ability to resist the applied forces. Basically, the present coupler does this by incorporating a plurality of continuous juxtapositioned reinforcement fibers which are aligned in the optimum spatial direction for mechanically strengthening the pipe joint during use. Such controlled directional orientation of the fiber component in the present coupler member enables the fiber placement to be fixed for maximum effectiveness in withstanding the particular stress being generated when the joined together pipe lengths are customarily used for the transport of pressurized fluids. Since the fiber materials currently used in this manner are generally stronger than the polymer matrix compositions also being employed, the overall strength produced in the composite member depends largely upon the fiber placement direction for the particular end product. The fiber reinforced coupler is thereby only as strong as the spatial direction of the included fibers with respect to the direction of the external stress when applied to said member. Thus, when the fiber reinforced coupler is stressed by internal fluid pressures in the direction of fiber placement, the applied load is withstood primarily by the included fibers and the coupler strength in resisting such stress is at a maximum value. Conversely, when the composite member is stressed in a perpendicular direction to the fiber direction, the applied force must necessarily be resisted primarily by the polymer matrix so that the coupler strength is at minimum. The relative amounts of the individual stresses being applied to the fiber reinforced coupler must also necessarily be considered for a proper fiber placement direction. For externally unrestrained pipe coupling, such as encountered with above ground pipe installations, the applied loads can be examined by treating the joined pipe lengths as a pressure vessel. From such analysis it is found that the stress applied to the pipe wall in the hoop direction is twice in amount as the applied stress in the pipe'saxial direction. Employing recognized shell theory calculations, it is further found that a fiber angle of 55° is needed to balance these applied loads assuming 90° to be in the pipe hoop direction and 0° to be aligned in the direction of the pipe's longitudinal axis. For constrained pipe installations, such as in-ground or having the pipe ends being held there can be only need for resisting hoop stress. Accordingly, fiber placement at or near a 90° angle with respect to the longitudinal pipe axis is dictated while further recognizing that some angle less than 90° may only be achievable with the fiber winding in the customary manner. While the foregoing considerations apply equally to couplers having different physical configurations such as fittings and the like, it can be appreciated that selecting an appropriate fiber placement angle for a specific coupler being contemplated requires that the above illustrated type analysis be carried out.

It is an important object of the present invention, therefore, to provide a novel fiber reinforced thermoplastic coupler member exhibiting improved resistance to applied stress when used.

It is another object of the present invention to provide a novel fiber reinforced thermoplastic coupler having the fiber placement physically incorporated therein so as to resist the applied stress during use in a significantly improved manner.

Still another object of the present invention is to provide a more simple construction for a fiber reinforced thermoplastic coupler which includes a plurality of continuous juxtapositioned fibers being physically incorporated therein so as to be aligned in a predetermined spatial direction resisting applied stress during coupler use.

These and still further objects of the present invention will become more apparent upon considering the following more detailed description of the present invention.

SUMMARY OF THE INVENTION

Basically the improved coupler of the present invention for attachment to conventional pipe lengths being joined together comprises a sleeve type body formed of a solid thermoplastic organic polymer with inner and outer surfaces and further having a plurality of continuous juxtapositioned reinforcement fibers thermally bonded to the outer surface in a further defined manner. To impart increased mechanical strength at the joint location where being employed requires that the fiber placement be carried out with the fibers being physically aligned in a predetermined spatial direction with respect to said sleeve member while also being subjected to a selected amount of externally applied mechanical force during registration with the thermoplastic body member. Suitable thermoplastic organic polymer materials serving as the matrix in said composite member include but are not limited to polyethylene such as high density polyethylene and medium density polyethylene, polypropylene, polyphenylene sulfide, polyetherketoneketone, polyamide, polyamideimide and polyvinylidene difluoride. Similarly, a wide variety of materials are found suitable as the fiber reinforcement in the present coupler to again include but not be limited to ceramics, metals, carbon, aramid and other polymer fibers having softening temperatures above that of the coupler service temperature in use and glass compositions such as E type and S type glasses. When being utilized to couple the thermoplastic pipe ends together after joinder thereto with various already known thermal bonding processes, the completed pipe system can now serve to transport fluids at significantly higher operating pressures than hereinbefore experienced.

The performance improvement achieved with the present coupler is deemed primarily attributable to a novel manner of securing the desired fiber alignment when being thermally bonded to the outer polymer surface. While a variety of conventional heating sources are deemed satisfactory for this purpose, there is a requirement for the fiber alignment to be maintained until permanent bonding of these fibers to the polymer substrate has taken place. The means of preserving the fiber alignment according to the present invention until the melted polymer in physical contact therewith again becomes solid requires that said fibers be subjected to an appropriate applied mechanical force during the thermal bonding procedure. Such manner of fiber placement can be carried out by employing external tension winding means to guide the fiber reinforcement while being bonded to the polymer sleeve body. An alternate means for providing the needed fiber alignment is a compaction roller to apply mechanical pressure to the heated fiber and polymer materials while being bonded together. Use of a compaction roller in such fiber placement can apply an external compaction force with zero tension force being applied if desired although it is within contemplation of the present invention for both forms of external mechanical energy to be employed together when found beneficial. Another advantage of compaction roller use is the ability to orient such means in any spatial direction enabling fiber placement at a predetermined fiber angle dictated by the pipe lengths being joined together. The selected compaction roller can be actively heated or passively heated with ambient heat or cooled as needed during the fiber placement. Any suitable heat source can be used for bonding the fiber reinforcement to the melted polymer substrate with contemplated heat sources including but not limited to gases such as inert gases, oxidizing gases and reducing gases, including mixtures thereof, infrared heating sources such as infrared panels and focused infrared means, conduction heating sources such as heated rollers, belts and shoe devices, electrical resistance heating sources, laser heating sources, microwave sources, RF heating sources and plasma heating sources. Similarly, various precursor continuous fiber materials are contemplated for use in accordance with the invention to include a parallel alignment of the bare fibers for placement in the foregoing manner and conventional fiber tapes having the continuous parallel oriented fibers bonded together in a polymer matrix. It is still further contemplated in accordance with the present invention for the presently improved coupler to have multiple fiber layers applied in the foregoing manner as well as embodiments having localized fiber placement meeting a wide variety of reinforcement needs. Thus, such coupler can be formed to be relatively stiff in the center with lower stiffness at the edges by having additional fiber layers placed at the center location. Securing the herein described coupler embodiment to the pipe ends being joined together can be routinely carried out in a conventional manner including thermal melting of the inner coupler surface for direct bonding to the mating outer pipe surface as well as using preformed adhesives to effect such final bonding action.

In a different embodiment, an electrofusion type coupler is utilized which comprises a tubular sleeve member again formed of a selected solid thermoplastic organic polymer with inner and outer surfaces which includes a plurality of electrical heating metal wires being embedded adjacent the inner surface while further including a plurality of the continuous juxtapositioned reinforcement fibers which are thermally bonded to the outer surface of said sleeve member in a predetermined spatial direction with respect thereto. The material composition of the fiber reinforcement in the herein described coupler embodiment can again be selected from the group consisting of ceramics, metals, carbon and organic polymers with the fiber placement being carried out in the same manner hereinabove described for the preceding embodiment. Thus, an external heating source is employed for bonding of the selected fiber to said sleeve member while preserving fiber alignment during such bonding action with an applied mechanical force. The electrical heating metal wires in the present coupler are only subsequently employed for thermally bonding the already prepared coupler to the pipe ends being joined together. It can be further appreciated that the same heat sources and external force means previously disclosed for fiber placement in the preceding coupler embodiment can likewise be employed for this purpose in fabricating the present coupler member. Similarly, the present coupler can be formed with multiple fiber layers and localized fiber placement as was previous disclosed in connection with said preceding coupler embodiment.

Still further modification is contemplated for both of the herein disclosed type couplers. Since the conventional pipe lengths being joined together with said couplers have cross sectional shapes which are both circular and noncircular, it follows that the present couplers will be fabricated to have a conforming cross sectional shape. Additionally, an outer protective coating to include heat shrinkable tubing, wrapped or extruded coatings and the like can be applied to said couplers in a conventional manner for protection of the fiber reinforcement from environmental or mechanical damage and/or corrosion.

BRIEF DESCRIPTION OF THE DRAWINGS

FIGS. 4 through 7 depict additional representative fiber reinforced thermoplastic couplers of the present invention after being bonded to coupled pipe lengths.

DETAILED DESCRIPTION OF THE PREFERRED EMBODIMENTS

Figure 1:
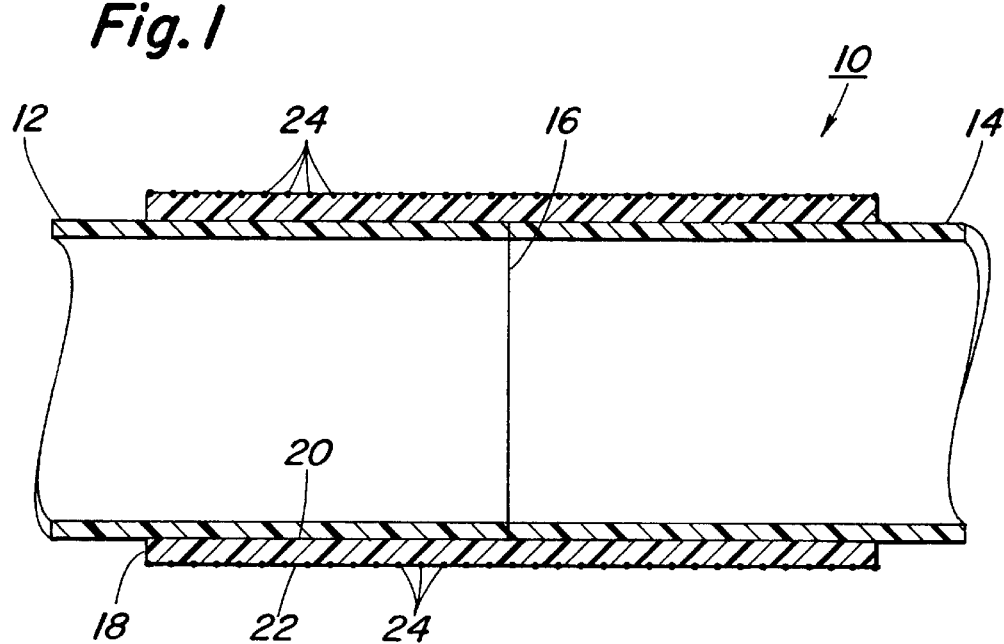
FIG. 1 Is a cross sectional view depicting a reprsentative fiber reinforced thermoplastic coupler of the present invention after bonding to coupled pipe lengths at the joint location and which employs a plurality of continuous juxtapositioned reinforcement fibers aligned in the pipe hoop direction.

Referring to the drawings, FIG. 1 depicts in cross section a typical sleeve type coupler 10 of the present invention after having been thermally bonded to a pair of thermoplastic pipe lengths 12 and 14 which are butted together or joined together at the ends in a conventional in-line configuration. As can be observed in the drawing, said coupler 10 is bonded to said pipe lengths at the joint location 16 and extends axially about the outer surface of the joined pipe members in a spatial direction corresponding to the common longitudinal axis of these members. Coupler 10 has a cylindrical body 18 formed with a selected thermoplastic organic polymer which includes inner and outer surfaces 20 and 22, respectively, and with said inner surface 20 having been bonded to the outer pipe surfaces with sufficient heating in a conventional manner to produce softening or melting between the contacting thermoplastic parts followed by solidification. Said coupler member further includes a plurality of continuous juxtapositioned reinforcement fibers 24 having a directional orientation as shown which is transverse to the longitudinal axis of the now joined pipe and coupling members. The fiber reinforcement 24 can be seen as having been thermally bonded with external heating (not shown) to the outer surface 22 of the thermoplastic coupler body 18 after having been deposited in the particular manner previously disclosed for fiber placement in accordance with the present invention. Thus, the depicted fiber reinforcement 24 can be wound about the outer surface of the coupler body for satisfactory placement in the indicated spatial direction while being subjected to an external mechanical force (not shown) keeping the individual fibers in place. It will be further apparent from the description provided herein regarding the coupler configuration being illustrated that such fiber reinforcement can similarly be aligned at various other angles in the coupler. While the illustrated fiber placement provides hoop reinforcement when the joined together pipe lengths are in service, it can readily be seen that axial reinforcement as well as helical reinforcement can also be produced in the herein illustrated coupler simply upon selecting different fiber angles for the fiber placement. Axial reinforcement is produced with fiber placement being aligned in the direction of the pipe's longitudinal axis whereas helical reinforcement occurs when the fiber direction is oriented at various interim angles respecting said longitudinal pipe axis. It will be still further apparent from the herein illustrated embodiment that additional fiber layers can also be successively bonded in the same manner on the outer surface of the coupler for still greater mechanical strength and with the particular fiber direction in the individual fiber layers again being dictated by ability of the final coupler to withstand fluid pressures being exerted when the joined together pipes are in service.

Figure 2:
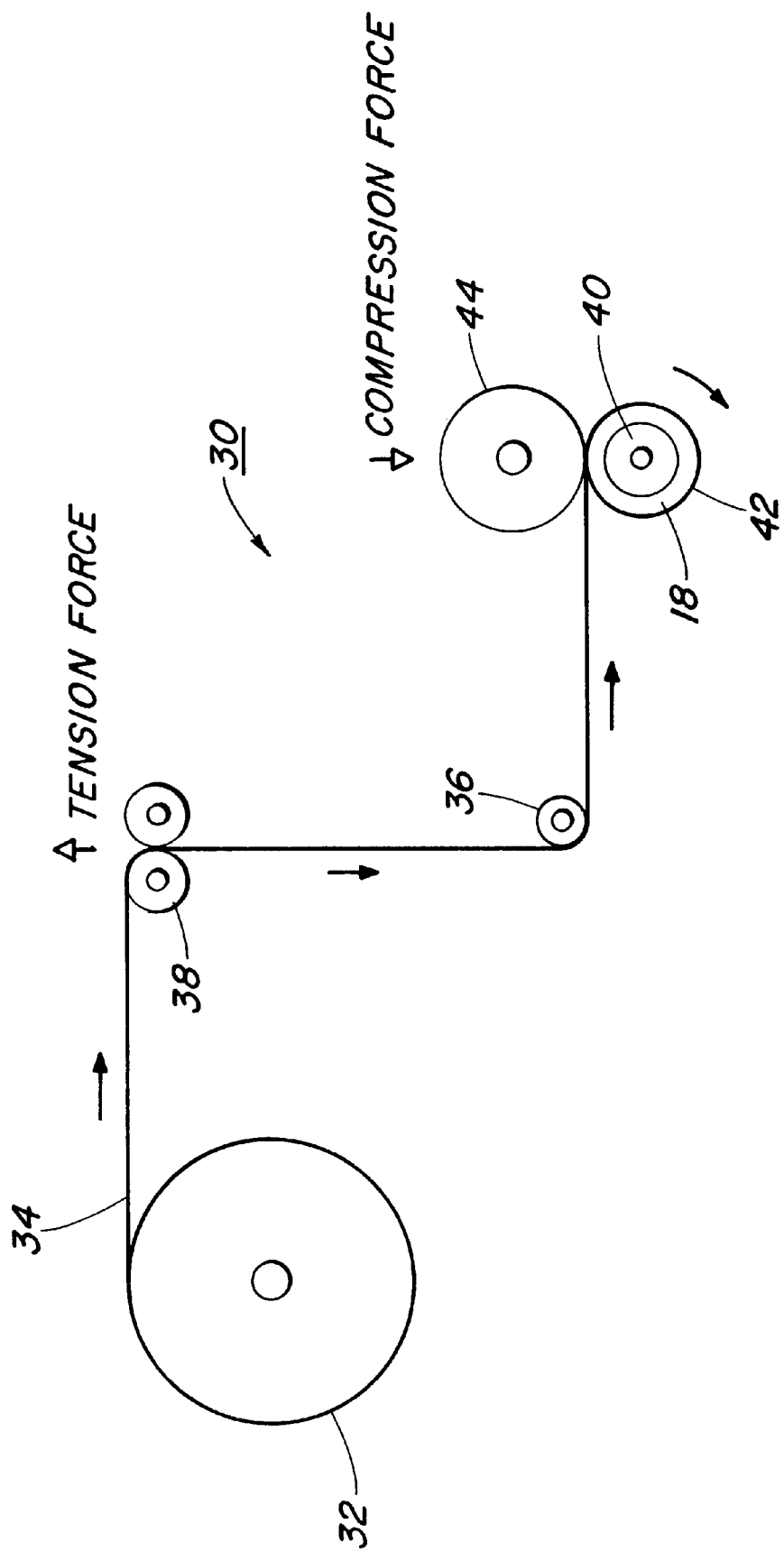
FIG. 2 is a schematic view depicting typical processing equipment which can be employed to fabricate the fiber reinforced thermoplastic coupler of FIG. 1.

In FIG. 2 there is shown schematically a typical processing equipment which can be employed to fabricate the fiber reinforced thermoplastic coupler of FIG. 1. The depicted equipment further includes representative processing steps being employed for said fabrication according to the present invention. Said combined equipment and process flow chart 30 first utilizes a known type rotary creel 32 to supply a continuous length of preformed fiber reinforcement tape 34 having the hereinbefore described fiber arrangement. The supplied tape is pulled forward with a first conventional motor driven roll 36 while a pair of tension rolls 38 apply a selected amount of tension force thereto as depicted in the present drawing. The tape next proceeds to a second conventional motor driven roller 40 on which the previously disclosed cylindrically shaped thermoplastic coupler body 18 is rotatably mounted for combination of the fiber reinforcement therewith on its outer surface 42 while said roller is rotating in the direction shown. A heated motor driven compaction roller 44 exerts pressure in the direction shown while heating the now physically combined fiber and coupler body to a sufficiently elevated temperature for the desired thermal bonding therebetween to be carried out. While the fiber alignment in the depicted illustration can be seen to be transverse to the longitudinal central axis of the cylindrical coupler body when thermally bonded together it is within contemplation of the present invention to orient said compaction roller in other spatial directions enabling fiber placement to be carried out at other desired fiber angles. Known robotic equipment means can also be employed enabling fiber placement in accordance with the present invention while still further including automated fiber dispensing and fiber cutoff means.

Figure 3:
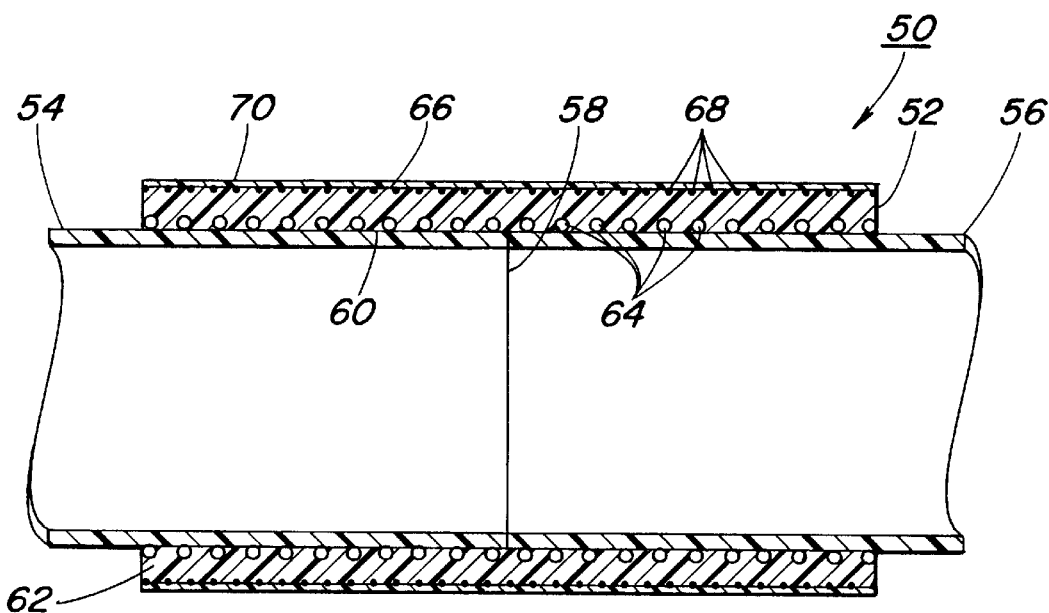
FIG. 3 is a cross sectional view depicting a different representative fiber reinforced thermoplastic coupler of the present invention in use and which includes electrical heating metal wires while again spatially orienting the continuous juxtapositioned reinforcement fibers in the pipe hoop direction.

FIG. 3 is a cross sectional view depicting a different representative fiber reinforced thermoplastic coupler of the present invention. An electrofusion type coupler 50 is shown again having a cylindrical configuration 52 and being thermally bonded to a pair of thermoplastic pipe lengths 54 and 56 which are butted or joined together at the ends in a conventional manner. Said coupler 50 is thermally bonded to said pipe lengths at the joint location 58 with the inner surface 60 of its thermoplastic body portion 62 having embedded therein a plurality of electrical heating metal wires 64 which perform this bonding action. Outer surface 66 of said thermoplastic body 62 includes a plurality of continuous juxtapositioned reinforcement fibers 68 thermally bonded thereto with external heating. As can be seen in the drawing, the direction of the fiber reinforcement 68 in the present coupler embodiment is again transverse to the longitudinal axis of the joined pipe lengths. A conventional outer protective coating 70 has been applied in the customary manner to protect the fibers in said coupler embodiment from exposure to environmental or mechanical damage.

FIG. 4 depicts a pipe joint 80 wherein a pair of pipe lengths 82 and 84 which are aligned in an in-line configuration have been joined together with a sleeve type coupler 86 of the present invention. As can be noted in said drawing, said coupler includes reinforcement fibers 88 having a directional orientation corresponding to the longitudinal axis of both pipe lengths.

In FIG. 5 there is again a pipe joint 90 having a pair of pipe lengths 92 and 94 which are aligned in the same spatial direction that have been joined together at the butt ends with a representative fiber reinforced thermoplastic coupler of the present invention 96. Said coupler differs from that employed in the proceeding pipe joint configuration, however, since the spatial direction of the reinforcement fiber 98 resides at an angle with respect to the longitudinal axis 99 of the joined pipe lengths.

Figure 6:
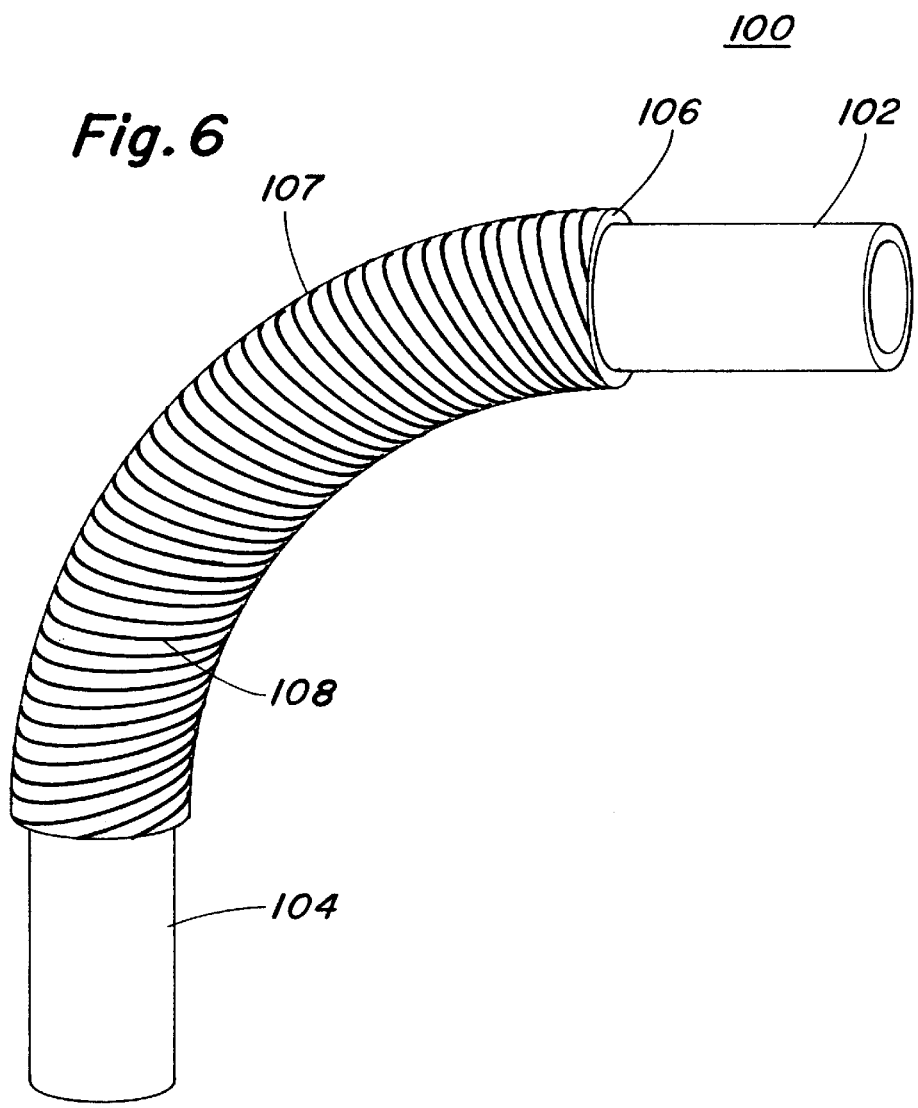

FIG. 6 depicts a pipe joint 100 formed with a pair of pipe lengths 102 and 104 having longitudinal axes aligned in different spatial directions. The fiber reinforced thermoplastic coupler 106 joining each pipe length together at the respective butt ends is shown to have a curved shape 107 with the reinforcement fibers 108 having a placement angle which is aligned for the most part in the hoop direction with respect to the longitudinal axis of both joined pipe members.

Figure 7:
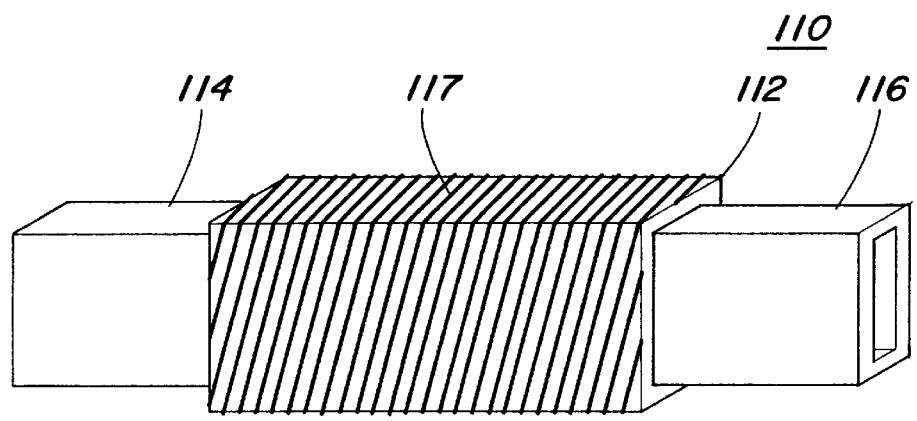

FIG. 7 shows a pipe joint 110 employing a representative fiber reinforced thermoplastic coupler of the present invention 112 to join together a pair of pipe lengths 114 and 116 having a noncircular cross section. As can be noted in said drawing, said coupler conforms to the same rectangular cross section of the joined pipe lengths with the placement angle of the reinforcing fibers 117 residing at an angle with respect to the common longitudinal axis of both pipe members.

Figure 8:
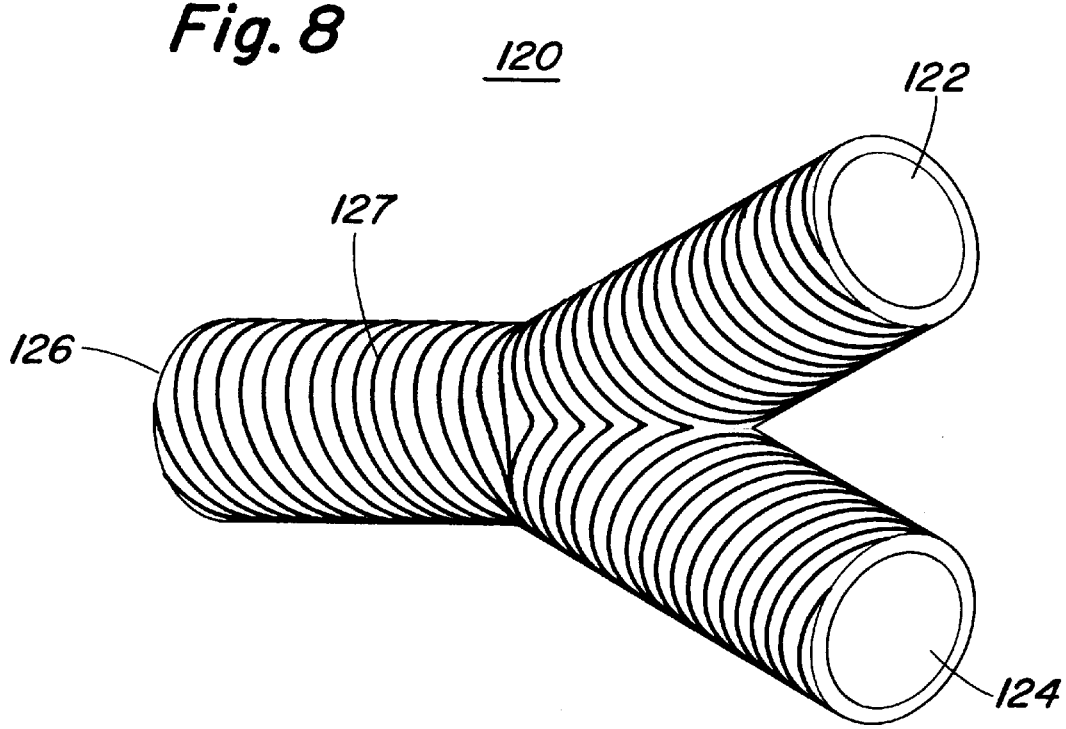
FIGS. 8 and 9 depict representative fiber reinforced thermoplastic couplers of the present invention forming Y and T pipe joints.

FIG. 8 depicts a representative fiber reinforced thermoplastic coupler of the present invention 120 forming a Y joint when affixed at its terminal openings 122–126 to pipe ends bonded thereto. Again, it can be seen in the present drawing that the placement angle for the reinforcement fibers 127 provided in said coupler generally corresponds to a 90° angle or hoop direction with respect to the longitudinal axis of the pipe lengths when joined thereto.

Figure 9:
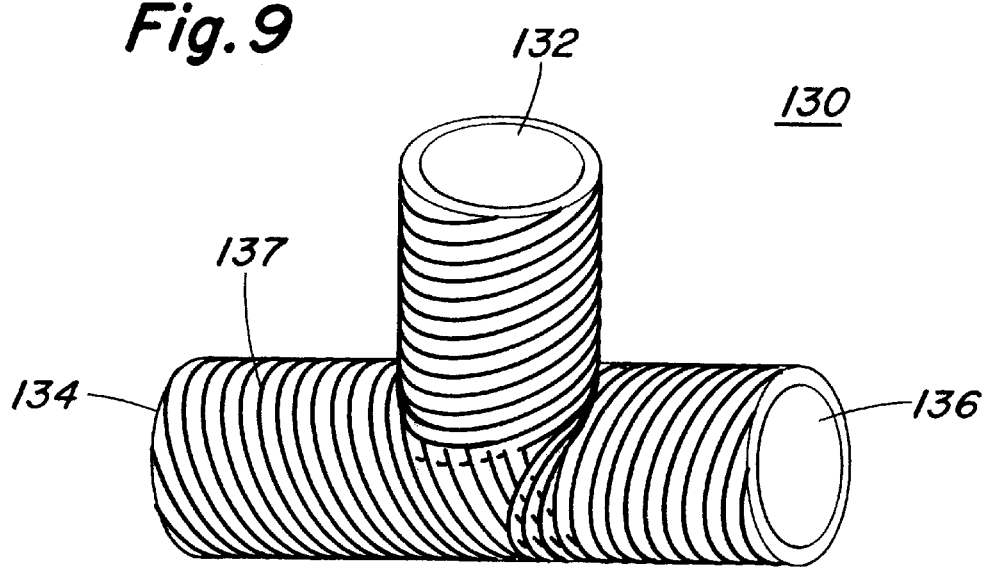

Remaining FIG. 9 shows a representative fiber reinforced thermoplastic coupler of the present invention 130 forming a T joint when bonded to pipe lengths invention into terminal openings 132–136. The placement angle for the reinforcement fibers 137 provided in said coupler again generally resides in the hoop direction with respect to the longitudinal axis of the joined pipe members.

It will be apparent from the foregoing description that a broadly useful and novel fiber reinforced thermoplastic coupler has been provided exhibiting significantly improved resistance to applied stress when utilized. It is contemplated that already known modifications can be made in the configuration of the disclosed coupler than herein specifically recited as well as material substitutions being made for its component parts. Consequently, it is intended to cover all such variation in the disclosed coupler which may be devised by persons skilled in the art as falling within the true spirit and scope of the claimed invention.

What we claim as new and desire to secure by Letters Patent of the United States is:

1. A coupler for attachment to pipe lengths being joined together therewith which comprises a sleeve member formed of a solid thermoplastic organic polymer with inner and outer surfaces having a plurality of continuous juxtapositioned reinforcement fibers formed with a solid material composition having greater mechanical strength than the selected organic polymer and selected from the group consisting of ceramics, metals, carbon and organic polymers which are thermally bonded to the outer surface of said sleeve member in a predetermined spatial direction with respect thereto while being subjected to a selected amount of externally applied mechanical force, said fiber spatial direction requiring a fiber placement angle with respect to the longitudinal pipe axis that helps restrain the force produced with internal fluid pressure in the intended pipe installation.

2. The coupler of claim 1 wherein the reinforcement fibers are wound in the hoop direction.

3. The coupler of claim 1 wherein the reinforcement fibers are aligned in a spatial direction corresponding to the longitudinal axis of at least one of the pipe lengths to which it is attached.

4. The coupler of claim 3 wherein the reinforcement fibers are aligned at an angle with respect to said longitudinal axis.

5. The coupler of claim 1 wherein the pipe lengths when joined together are aligned with respect to each other so that both longitudinal pipe axes reside in the same spatial direction.

6. The coupler of claim 5 wherein the sleeve member has a cylindrical configuration.

7. The coupler of claim 1 wherein the pipe lengths when joined together are not aligned with respect to each other so that the respective longitudinal pipe axes reside in different spatial directions.

8. The coupler of claim 6 wherein the sleeve member forms a Y joint with the pipe lengths being joined together.

9. The coupler of claim 6 wherein the sleeve member forms a T joint with the pipe lengths being joined together.

10. The coupler of claim 1 wherein the reinforcement fibers are thermally bonded to the outer surface of said sleeve member while being subjected to a selected amount of externally applied tensile force.

11. The coupler of claim 1 wherein the reinforcement fibers are thermally bonded to the outer surface of said sleeve member while being subjected to a selected amount of externally applied compression force.

12. An electrofusion coupler for attachment to pipe lengths being joined together which comprises a tubular sleeve member formed of a solid thermoplastic organic polymer having inner and outer surfaces which includes a plurality of electrical heating metal wires being embedded adjacent the inner surface which further includes a plurality of continuous juxtapositioned reinforcement fibers formed with a solid material composition having greater mechanical strength than the selected organic polymer and selected from the group consisting of ceramics, metals, carbon and organic polymers which are thermally bonded to the outer surface of said sleeve member in a predetermined spatial direction with respect thereto while being subjected to a selected amount of externally applied mechanical force, said fiber spatial direction requiring a fiber placement angle with respect to the longitudinal pipe axis that helps restrain the force produced with internal fluid pressure in the intended pipe installation.

13. The coupler of claim 12 wherein the cross section of the tubular shaped sleeve member is circular.

14. The coupler of claim 12 wherein the cross section of the tubular shaped sleeve member is noncircular.

15. The coupler of claim 12 wherein the reinforcement fibers are wound about the outer surface of the sleeve member.

16. The coupler of claim 12 wherein the reinforcement fibers are aligned in a spatial direction corresponding to the longitudinal axis of at least one of the pipe lengths to which it is attached.

17. The coupler of claim 16 wherein the reinforcement fibers are aligned at an angle with respect to said longitudinal axis.

18. The coupler of claim 12 wherein the pipe lengths when joined together are aligned with respect to each other so that both longitudinal pipe axes reside in the same spatial direction.

19. The coupler of claim 18 wherein the sleeve member has a cylindrical configuration.

20. The coupler of claim 12 wherein the pipe lengths when joined together are not aligned with respect to each other so that the respective longitudinal pipe axes reside in different spatial directions.

21. The coupler of claim 19 wherein the sleeve member forms a Y joint with the pipe lengths being joined together.

22. The coupler of claim 19 wherein the sleeve member forms a T joint with the pipe lengths being joined together.

23. The coupler of claim 12 wherein the reinforcement fibers are thermally bonded to the outer surface of said sleeve member while being subject to a selected amount of externally applied tensile force.

24. The coupler of claim 12 wherein the reinforcement fibers are thermally bonded to the outer surface of said sleeve member while being subjected to a selected amount of externally applied compression force.

25. The coupler of claim 12 wherein the reinforcement fibers are thermally bonded to the outer surface of said sleeve member while being subjected to selected amounts of combined externally applied tensile and compression forces.

26. An electrofusion coupler for attachment to pipe lengths being joined together which comprises a tubular shaped sleeve member formed of thermoplastic organic polymer having inner and outer surfaces which includes a plurality of electrical heating metal wires being embedded adjacent the inner surface and which further includes a plurality of continuous juxtapositioned reinforcement fibers formed with a solid material composition having greater mechanical strength than the selected organic polymer and selected from the group consisting of ceramics, metals, and organic polymers which are thermally bonded to the outer surface of said sleeve member in a predetermined spatial direction with respect thereto while being concurrently subjected to a selected amount of tension being applied to said fibers from an external source in the longitudinal fiber direction together with a selected amount of compression being applied to said fibers from an external source in a fiber direction transverse thereto, said fiber spatial direction requiring a fiber placement angle with respect to the longitudinal pipe axis that helps restrain the force produced with internal fluid pressure in the intended pipe installation.

27. The coupler of claim 26 wherein continuous carbon fibers are employed.

28. A pair of thermoplastic pipe lengths joined together at one end with a coupler which comprises a sleeve member formed of thermoplastic organic polymer with inner and outer surfaces having a plurality of continuous juxtapositioned reinforcement fibers formed with a solid material composition having greater mechanical strength than the selected organic polymer and selected from the group consisting of ceramics, carbon, metals and organic polymers which are thermally bonded to the outer surface of said sleeve member in a predetermined spatial direction with respect thereto while being subjected to a selected amount of externally applied mechanical force, said fiber spatial direction requiring a fiber placement angle with respect to the longitudinal pipe axis that helps restrain the force produced with internal fluid pressure in the intended pipe installation.

29. A pair of thermoplastic pipe lengths joined together at one end with an electrofusion coupler which comprises a tubular shaped sleeve member formed of thermoplastic organic polymer having inner and outer surfaces which includes a plurality of electrical heating metal wires being embedded adjacent the inner surface and which further includes a plurality of continuous juxtapositioned reinforcement fibers formed with a solid material composition having greater mechanical strength than the selected organic polymer and consisting of ceramics, metals, carbon and organic polymers which are thermally bonded to the outer surface of said sleeve member in a predetermined spatial direction with respect thereto while being subjected to a selected amount of externally applied mechanical force, placement angle with respect to the longitudinal pipe pipe axis that helps restrain the force produced with internal fluid pressure in the intended pipe installation.

* * * * *